US011420881B2

(12) United States Patent
Katz

(10) Patent No.: US 11,420,881 B2
(45) Date of Patent: *Aug. 23, 2022

(54) APPARATUS, METHOD AND SYSTEM TO REMOVE CONTAMINATES FROM CONTAMINATED FLUIDS USING SOLAR ENERGY

(71) Applicant: Katz Water Tech, LLC, Houston, TX (US)

(72) Inventor: Gary P. Katz, Houston, TX (US)

(73) Assignee: Katz Water Tech, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/115,762

(22) Filed: Dec. 8, 2020

(65) Prior Publication Data
US 2021/0094843 A1    Apr. 1, 2021

Related U.S. Application Data

(63) Continuation of application No. 15/729,639, filed on Oct. 10, 2017, now Pat. No. 10,858,267, which is a
(Continued)

(51) Int. Cl.
C02F 1/00    (2006.01)
C02F 1/04    (2006.01)
(Continued)

(52) U.S. Cl.
CPC ............. *C02F 1/048* (2013.01); *B01D 3/065* (2013.01); *C02F 1/041* (2013.01); *C02F 1/042* (2013.01);
(Continued)

(58) Field of Classification Search
USPC .............................................. 210/650; 203/7
See application file for complete search history.

(56) References Cited

U.S. PATENT DOCUMENTS 3,048,373 A  *  8/1962  Bauer ...................... B01D 3/32
                                                     203/99
4,518,503 A  *  5/1985  Fermaglich ............. C02F 9/005
                                                    210/186
(Continued)

FOREIGN PATENT DOCUMENTS

CN    101704560    7/2009
CN    201340212    11/2009
(Continued)

OTHER PUBLICATIONS

Mahmoud Shatat "Water desalination technologies utilizing conventional and renewable energy sources" International Journal of Low-Carbon Technologies, vol. 9, Apr. 6, 2012.
(Continued)

*Primary Examiner* — Nina Bhat
(74) *Attorney, Agent, or Firm* — Gary P. Katz; Katz Law Group, LLC

(57) ABSTRACT

An apparatus, system and method to remove purified vapor from a contaminated fluid using solar energy is disclosed. The apparatus comprises an inlet wherein contaminated fluid flows in the apparatus through the inlet; at least two outlets wherein a first outlet exits purified vapor and a second outlet wherein contaminated fluid with a portion removed as purified vapor exits the apparatus; an energy source that causes the contaminated fluid to heat to a temperature wherein at least a portion of the contaminated fluid is converted to purified vapor; at least two different flow paths from at least one inlet to the first outlet and second outlet, the first and second flow paths flow through at least a portion of the apparatus wherein differences causes the lighter purified vapor to take a different path than the contaminated fluid exiting the second outlet.

39 Claims, 4 Drawing Sheets

US 11,420,881 B2

Page 2

Related U.S. Application Data continuation of application No. 14/724,803, filed on May 28, 2015, now Pat. No. 9,783,431.

(60) Provisional application No. 62/003,874, filed on May 28, 2014.

(51) Int. Cl.
*B01D 3/06* (2006.01)
*C02F 103/02* (2006.01)

(52) U.S. Cl.
CPC .. *C02F 2103/023* (2013.01); *C02F 2209/005* (2013.01); *C02F 2303/22* (2013.01); *Y02W 10/37* (2015.05)

(56) References Cited

U.S. PATENT DOCUMENTS

| | | | | |
|---|---|---|---|---|
| 4,643,832 A * | 2/1987 | Iniotakis | ........... | C02F 1/048 |
| | | | | 95/290 |
| 4,957,624 A * | 9/1990 | Peranio | ........... | C02F 1/02 |
| | | | | 210/138 |
| 5,932,074 A * | 8/1999 | Hoiss | ........... | B01D 1/007 |
| | | | | 203/10 |
| 6,083,382 A * | 7/2000 | Bird | ........... | B01D 61/06 |
| | | | | 210/170.11 |
| 6,712,882 B1 * | 3/2004 | De Bie | ........... | B01D 5/009 |
| | | | | 210/691 |
| 7,261,120 B2 | 8/2007 | Müller | | |
| 7,340,879 B2 * | 3/2008 | Kamen | ........... | B01D 3/10 |
| | | | | 60/517 |
| 7,465,375 B2 | 12/2008 | Demers | | |
| 7,488,158 B2 * | 2/2009 | Demers | ........... | F04C 19/002 |
| | | | | 417/69 |
| 7,510,658 B2 * | 3/2009 | Gordon | ........... | B01D 61/025 |
| | | | | 210/652 |
| 7,597,784 B2 | 10/2009 | Bednarek | | |
| 7,707,830 B2 | 5/2010 | Bednarek | | |
| 7,731,854 B1 * | 6/2010 | Herbst | ........... | C02F 9/00 |
| | | | | 210/651 |
| 7,785,448 B2 * | 8/2010 | Owens | ........... | F22B 37/18 |
| | | | | 159/24.2 |
| 7,862,692 B2 * | 1/2011 | Hong | ........... | B01D 1/26 |
| | | | | 159/17.1 |
| 7,950,250 B2 * | 5/2011 | Holtzapple | ........... | F04F 5/54 |
| | | | | 62/500 |
| 7,967,946 B2 * | 6/2011 | Ling | ........... | B01D 3/004 |
| | | | | 122/491 |
| 8,043,479 B2 * | 10/2011 | Duesel, Jr. | ........... | C02F 1/10 |
| | | | | 261/123 |
| 8,069,676 B2 * | 12/2011 | Kamen | ........... | B01D 5/006 |
| | | | | 62/291 |
| 8,075,740 B2 * | 12/2011 | Bailie | ........... | C02F 1/06 |
| | | | | 203/DIG. 16 |
| 8,273,165 B2 * | 9/2012 | Rock | ........... | B01D 5/0003 |
| | | | | 210/512.1 |
| 8,282,708 B2 * | 10/2012 | Spiegelman | ........... | B01D 63/06 |
| | | | | 95/52 |
| 8,282,790 B2 | 10/2012 | Demers | | |
| 8,307,887 B2 | 11/2012 | Bednarek | | |
| 8,359,877 B2 * | 1/2013 | Kamen | ........... | B67D 1/0888 |
| | | | | 62/291 |
| 8,366,883 B2 * | 2/2013 | Bednarek | ........... | B01D 35/12 |
| | | | | 417/297.5 |
| 8,470,179 B2 * | 6/2013 | Al-Arifi | ........... | C02F 1/04 |
| | | | | 210/640 |
| 8,505,323 B2 * | 8/2013 | Kamen | ........... | C02F 1/08 |
| | | | | 62/291 |
| 8,506,762 B2 | 8/2013 | Bednarek | | |
| 8,511,105 B2 * | 8/2013 | Kamen | ........... | C02F 1/16 |
| | | | | 62/291 |
| 8,517,052 B2 | 8/2013 | Bednarek | | |
| 8,534,062 B2 | 9/2013 | Kamen | | |
| 8,535,538 B1 * | 9/2013 | Keeling | ........... | C02F 9/00 |
| | | | | 166/266 |
| 8,562,791 B2 * | 10/2013 | Riley | ........... | C02F 1/048 |
| | | | | 159/901 |
| 8,584,472 B2 * | 11/2013 | Kamen | ........... | B01D 5/006 |
| | | | | 62/291 |
| 8,679,291 B2 * | 3/2014 | Duesel, Jr. | ........... | B01D 1/305 |
| | | | | 210/768 |
| 8,718,827 B2 * | 5/2014 | Kamen | ........... | G01N 11/02 |
| | | | | 700/282 |
| 8,741,100 B2 * | 6/2014 | Duesel, Jr. | ........... | C02F 1/048 |
| | | | | 96/275 |
| 8,801,897 B2 * | 8/2014 | Duesel, Jr. | ........... | C02F 1/10 |
| | | | | 203/28 |
| 8,828,192 B2 | 9/2014 | Demers | | |
| 8,833,437 B2 * | 9/2014 | Singh | ........... | F22B 37/30 |
| | | | | 122/491 |
| 8,888,963 B2 | 11/2014 | Kamen | | |
| 8,926,731 B2 * | 1/2015 | Spiegelman | ........... | B01D 53/22 |
| | | | | 96/417 |
| 9,005,393 B2 | 4/2015 | Owens | | |
| 9,037,310 B2 | 5/2015 | Kamen | | |
| 9,039,819 B2 | 5/2015 | Rock | | |
| 9,044,692 B2 * | 6/2015 | Rock | ........... | B01D 45/12 |
| 9,156,712 B2 * | 10/2015 | Nicoll | ........... | C02F 1/445 |
| 9,186,598 B2 | 11/2015 | Bednarek | | |
| 9,259,665 B2 * | 2/2016 | Norton | ........... | B01D 3/008 |
| 9,278,868 B2 | 3/2016 | Kamen | | |
| 9,308,467 B2 | 4/2016 | Kamen | | |
| 9,309,104 B2 | 4/2016 | Kamen | | |
| 9,366,479 B2 * | 6/2016 | Duesel, Jr. | ........... | B01D 1/14 |
| 9,410,191 B2 * | 8/2016 | Alvarez, Jr. | ........... | A61L 2/208 |
| 9,416,031 B2 * | 8/2016 | Escher | ........... | C02F 1/447 |
| 9,593,809 B2 * | 3/2017 | LaRocque | ........... | F17D 3/01 |
| 9,604,858 B2 * | 3/2017 | Kamen | ........... | B01D 3/42 |
| 9,610,518 B2 | 4/2017 | Kamen | | |
| 9,612,058 B2 | 4/2017 | Singh | | |
| 9,617,167 B2 | 4/2017 | Kamen | | |
| 9,630,862 B2 | 4/2017 | Escher | | |
| 9,783,431 B2 * | 10/2017 | Katz | ........... | C02F 1/041 |
| 9,802,836 B2 * | 10/2017 | Thiers | ........... | B01D 1/26 |
| 9,802,845 B2 * | 10/2017 | Thiers | ........... | B01D 5/0012 |
| 9,808,738 B2 * | 11/2017 | Duesel, Jr. | ........... | F23G 7/085 |
| 9,808,740 B2 * | 11/2017 | Mahato | ........... | B01D 1/16 |
| 9,834,454 B2 * | 12/2017 | Frolov | ........... | B01D 3/007 |
| 9,926,215 B2 * | 3/2018 | Duesel, Jr. | ........... | C02F 1/70 |
| 9,937,435 B2 | 4/2018 | Kamen | | |
| 9,969,638 B2 * | 5/2018 | Govindan | ........... | B01D 65/08 |
| 9,981,199 B2 * | 5/2018 | Nadeau, Jr. | ........... | B01D 1/04 |
| 10,005,001 B2 | 6/2018 | Kamen | | |
| 10,137,384 B2 | 11/2018 | Rock | | |
| 10,155,174 B2 | 12/2018 | Kamen | | |
| 10,179,298 B2 | 1/2019 | Bednarek | | |
| 10,272,396 B2 * | 4/2019 | Katz | ........... | B01F 3/0865 |
| 10,385,851 B2 | 8/2019 | Demers | | |
| 10,457,567 B2 | 10/2019 | Kamen | | |
| 10,479,706 B2 * | 11/2019 | Katz | ........... | E21B 15/02 |
| 10,507,403 B2 | 12/2019 | Bednarek | | |
| 10,508,044 B2 * | 12/2019 | Wilson | ........... | B01D 19/0057 |
| 10,538,445 B2 * | 1/2020 | Chidambaran | ........... | B01D 9/00 |
| 10,858,267 B2 * | 12/2020 | Katz | ........... | B01D 3/065 |
| 10,864,482 B2 * | 12/2020 | Katz | ........... | E21B 43/34 |
| 10,882,761 B2 * | 1/2021 | Katz | ........... | C02F 1/041 |
| 11,034,605 B2 * | 6/2021 | Katz | ........... | B01D 1/14 |
| 2004/0074757 A1 * | 4/2004 | Owens | ........... | B01D 29/66 |
| | | | | 202/172 |
| 2005/0000572 A1 * | 1/2005 | Muller | ........... | F17D 1/005 |
| | | | | 137/561 A |
| 2005/0016828 A1 * | 1/2005 | Bednarek | ........... | B01D 3/007 |
| | | | | 203/1 |
| 2008/0011681 A1 * | 1/2008 | Gordon | ........... | B01F 5/0603 |
| | | | | 210/650 |
| 2008/0296215 A1 | 12/2008 | Simon | | |
| 2009/0020481 A1 * | 1/2009 | Bailie | ........... | C02F 1/041 |
| | | | | 210/710 |
| 2011/0198285 A1 * | 8/2011 | Wallace | ........... | C01B 35/1045 |
| | | | | 423/283 |

(56) References Cited

U.S. PATENT DOCUMENTS

| | | | | |
|---|---|---|---|---|
| 2011/0259822 | A1* | 10/2011 | Al-Jlil | C02F 9/00 210/615 |
| 2012/0048715 | A1* | 3/2012 | James | C02F 1/048 203/14 |
| 2012/0090978 | A1 | 4/2012 | Bailie | |
| 2012/0292176 | A1* | 11/2012 | Machhammmer | B01D 1/16 202/153 |
| 2014/0034478 | A1* | 2/2014 | Rock | C02F 1/04 203/11 |
| 2014/0374235 | A1 | 12/2014 | Demers | |
| 2015/0083652 | A1* | 3/2015 | Hawks | C02F 9/00 210/295 |
| 2015/0129410 | A1* | 5/2015 | Govindan | B01D 1/14 202/185.1 |
| 2017/0036140 | A1* | 2/2017 | Enzenhofer | B01D 3/007 |
| 2017/0197844 | A1* | 7/2017 | Kamen | B01D 1/2896 |
| 2018/0050936 | A1 | 2/2018 | Thiers | |

FOREIGN PATENT DOCUMENTS

| | | |
|---|---|---|
| CN | 102010020 | 12/2010 |
| CN | 102241420 | 5/2011 |
| CN | 104773776 | 4/2017 |
| JP | 2013252473 | 12/2013 |
| WO | 2016/145953 | 7/2011 |
| WO | WO2016/145953 | 3/2015 |
| WO | 2017/008814 | 1/2017 |

OTHER PUBLICATIONS

Karan H. Mistry, "An improved model for multiple effect distillation", Taylor & Francis Online, U.K., Jul. 24, 2012.

Lucy Mar Camacho, "Advances in Membrane Distillation for Water Desalination and Purification Applications", MDPI.com, Jan. 25, 2013.

R.S.Silver, "An assessment of multiple effect boiling distillation in relation to multi-stage flash distillation", Elsevier, The Netherlands, Sep. 1971.

M.J. Burley, "Analytical comparison of the multi-stage flash and long-tube vertical distillation processes", Elsevier, The Netherlands, Aug. 3, 2001.

D.A.Hamed, "Thermal assessment of a multiple effect boiling (MEB) desalination system", Elsevier, The Netherlands, Nov. 7, 2001.

* cited by examiner

APPARATUS, METHOD AND SYSTEM TO REMOVE CONTAMINATES FROM CONTAMINATED FLUIDS USING SOLAR ENERGY

CROSS-REFERENCE TO RELATED APPLICATION

This application is a continuation of U.S. patent application Ser. No. 15/729,639 filed Oct. 10, 2017, entitled "An Apparatus and Method to Remove Contaminates From a Fluid," which issued as U.S. Pat. No. 10,858,267 and is a continuation of U.S. patent application Ser. No. 14/724,803 filed May 28, 2015, entitled "An Apparatus and Method to Remove Contaminates From a Fluid," which issued as U.S. Pat. No. 10,858,267 which claims priority and the benefit of under 35 U.S.C § 119(e) to U.S. Provisional Application No. 62/003,874 filed May 28, 2014, the disclosures of all three applications are hereby incorporated by reference.

FIELD

The present disclosure relates generally to devices and methods for removing contaminates from a fluid. More particularly, the present disclosure relates to devices and methods for using vapor generation to purify a fluid from contaminates in the fluid.

BACKGROUND

This section is intended to introduce the reader to various aspects of art, which may be associated with embodiments of the present invention. This discussion is believed to be helpful in providing the reader with information to facilitate a better understanding of particular techniques of the present invention. Accordingly, these statements are to be read in this light, and not necessarily as admissions of prior art.

Water, energy and industrial activity have a symbiotic relationship. Energy is needed to move water to people, businesses and industry to operate. Conversely, water, is necessary to produce energy and run business and industry.

A significant factor that determines the ultimate volume of water a power plant and some industrial plant needs is the cooling system. Most conventional power plants use either a "once-through" system or a cooling "tower." A once-through system pulls water from a body of water such as, an aquifer, a river or a lake. The system cycles the water through the power plant to help generate electricity and then discharges it back into the environment. A tower recirculates the water instead of discharging it, but a tower uses significantly more water because the water ends up being lost through evaporation, whereas the once-through system returns the water to the river or lake.

Steam from water or vapor from fluids is used for many purposes including heating, cooling and to power many devices including steam turbines to produce electricity. One problem with using fluids is that impurities in the fluids, usually salt in water, causes corrosion, scaling and other issues. This corrosion often requires the use of very expensive material that is highly corrosion resistant. In addition, excessive corrosion requires costly replacement of parts and additional labor charges increasing the cost of utilizing steam. Contaminates in fluids will raise the boiling temperature of the fluids which requires more energy to produce the steam, decreasing the efficiency of steam production and increasing costs. One solution is to use fresh water with low amounts of contaminates. The problem with fresh water is that fresh water is needed for agricultural and human consumption. In certain locations, there is not enough fresh water to satisfy human and agricultural consumption which can make the use of fresh water for steam generation problematic and expensive. The problem with removing contaminates from fluids is the equipment and processes required are very expensive because of the extensive amount of equipment needed and the amount of energy required to utilize the equipment. Accordingly, there is a need for apparatuses and methods to efficiently and cost effectively remove contaminates from liquids during steam generation.

Another issue with using water with impurities is scaling. Scaling is when contaminates such as salt precipitates out of a fluid and attaches to equipment. Too much scaling can cause a plant or equipment to fail. Scaling becomes more prevalent as temperature increases and contaminates increase. For this reason, many plants that require water do not use alternatives to fresh water such as, salt water as any significant increase in heat or salinity causes scaling issues.

Increased population growth and increased industrialization is causing certain geographic regions to exhaust renewable fresh water. To solve this problem methods and devices have been created to purify contaminated water to create fresh water for industrial, agricultural and human consumption. Currently, the most effective process utilizes reverse osmosis and membrane technology to remove contaminates and creates purified fresh water. The amount of equipment and energy required makes this technology costly to build and to operate. The idea of using steam generation to produce purified water is not novel. There are devices that can use directed energy to remove purified steam from contaminated fluids such as, water. Others have proposed combining steam generation for power and other uses to purify water. The problem has been the additional costs for additional equipment and the loss of efficiency has made these processes uneconomical. Accordingly, there is a need to maximize the efficiency of existing technology to efficiently and economically remove contaminates from contaminated water. This invention satisfies that need.

SUMMARY

In one embodiment, an apparatus is disclosed. In this embodiment, the apparatus comprises: an inlet wherein contaminated fluid flows in the apparatus through the inlet; at least two outlets wherein a first outlet exits purified vapor and a second outlet wherein contaminated fluid with a portion removed as purified vapor exits the apparatus; an energy source that causes the contaminated fluid to heat to a temperature wherein a portion of the contaminated fluid is converted to purified vapor; at least two different flow paths connecting the inlet to the second outlet. The first and second flow paths flow through at least a portion of the apparatus wherein gravity differences causes the lighter purified vapor to take a different path than the heavier contaminated fluid with the purified vapor exiting the first outlet and the contaminated fluid stream existing the second outlet.

In a second embodiment, a method is disclosed. In this embodiment, the method to purify contaminated fluid comprises: obtaining an apparatus with at least one inlet and at least two outlets connected to an energy source that can concentrate energy on the contaminated fluid; using the energy source on the contaminated fluid inside the apparatus to cause at least a portion of the contaminated water to change into a purified vapor state inside the apparatus; using at least two flow paths inside the apparatus wherein gravity separates at least a portion of the heavier contaminated fluid from the lighter purified vapor state; flowing the purified vapor state through the first outlet and flowing the contaminated fluid after a portion of fluid has been removed as a purified vapor state through the second outlet of the apparatus.

The foregoing summary is not intended to summarize each potential embodiment or every aspect of the present disclosure.

BRIEF DESCRIPTION OF THE DRAWINGS

The foregoing and other advantages of the present technique may become apparent upon reading the following detailed description and upon reference to the drawings in which.

DETAILED DESCRIPTION OF THE INVENTION

In one embodiment, this invention quickly and efficiently separates purified vapor usually steam from a fluid mixture containing contaminates such as, a salt water mixture. Other examples include contaminated water from agricultural, industrial, municipal and individual waste water usage.

Figure 1:
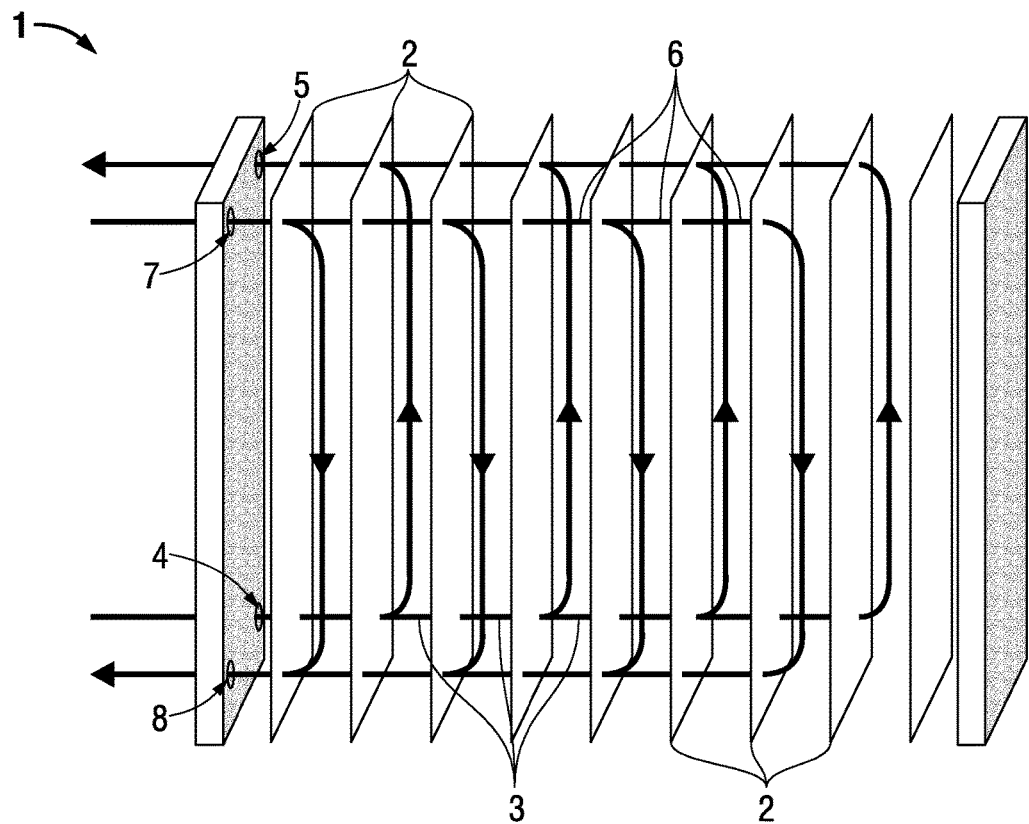
FIG. 1 illustrates a prior art heat exchanger that is typically used to convert water into steam.

FIG. 1 illustrates a prior art heat exchanger that is typically used in steam generation. The heat exchanger 1 has a series of plates 2. Cold water 3 is inserted through an inlet 4 and runs through a series of plates 2 before exiting an outlet 5 after receiving heat energy from steam or hot air 6 that is inserted through an inlet 7 and exits the outlet 8. U.S. Patent Application No. 2005/0061493 A1 discloses conventional heat exchangers and heat exchangers used in water purification systems. U.S. Patent Application No. 2005/0061493 A1 is hereby incorporated by reference.

Figure 2:
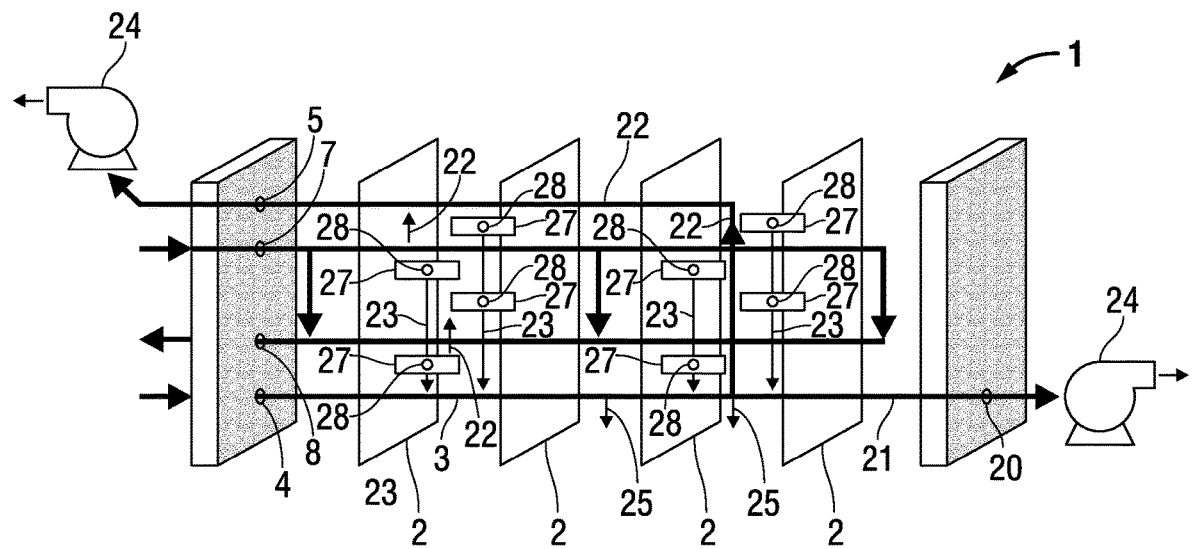
FIG. 2 illustrates an embodiment of this invention wherein baffles and openings are used to create multiple flow paths to separate contaminated fluid from purified vapor.

In the past costly equipment that wasted much of the energy of the steam was utilized in a series of heat exchanger and flash tanks as shown in FIG. 2 of U.S. Patent Application No. 2005/0061493. FIG. 1 of U.S. Patent Application No. 2005/0061493 shows that a vapor compressions evaporator is used outside of the heat exchanger to mix the feed and separate out concentrated product from distilled water using steam generated by a jet ejector. In contrast to U.S. Patent Application No. 2005/0061493, in an embodiment, this invention uses specifically engineered multiple flow paths inside an apparatus such as, a heat exchanger to quickly and efficiently use gravity differences in the apparatus to separate the purified vapor from the initial contaminated fluid. In another embodiment, a series of small baffles and openings are engineered inside the tubing to efficiently separate the salt water and purified steam. The baffles create alternative flow patterns whereby the lighter and faster moving steam is separated naturally from the contaminated fluid by gravity differences. In a third embodiment, interior sections of the heat exchangers are designed to create flash chambers, distillation columns, and condensation vessels.

This apparatus enables a process for the efficient separation of a vapor volatile component from a non-volatile component in a mixture. In some cases, the non-volatile component comprises a salt or a sugar and the volatile component comprises water.

FIG. 2 is an illustration of an embodiment using baffles and small openings to create alternative flow paths. The heat exchanger 1 in this figure has been modified from the prior art heat exchanger in FIG. 1. Similar elements in FIG. 1 have been giving the same reference numerals in FIG. 2. In the embodiment shown in FIG. 1 an additional outlet 20 and flow paths 21 has been created for the contaminated fluid with a portion of the fluid removed as purified fluid 22 as vapor. Separate flow paths are created for the remnant contaminated fluid 23 removed from the vapor stream 22, through the use of aligned holes 28 in baffles 27. The baffles 27 with the aligned holes 28 can be placed in the plates or tubes of a standard heat exchanger. In this embodiment, gravity causes the lighter purified vapor to rise and the heavier contaminated fluid to fall as shown in the arrows. Additional pumps 24 and drains 25 may be utilized to quickly remove the contaminated fluid from the purified fluid, as discussed below.

Figure 3:
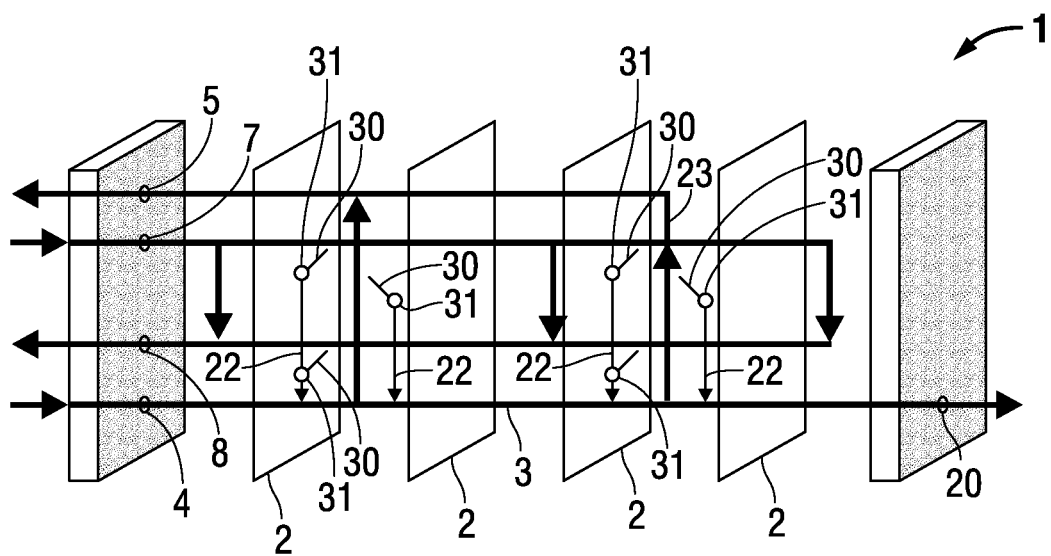
FIG. 3 illustrates an embodiment of this invention wherein slanted baffles and openings are used to create multiple flow paths to separate contaminated fluid from purified vapor.

FIG. 3 is an illustration of an embodiment using slanted baffles 30 and small openings 31 to create alternative flow paths. The heat exchanger 3 in this figure has been modified from the prior art heat exchanger in FIG. 1. Similar elements in FIG. 1 and FIG. 2 have been giving the same reference numerals in FIG. 3. In the embodiment shown in FIG. 3, the baffles are slanted 30. The slanted baffles 30 inside the heat exchanger 1 create areas in which purified vapor can accumulate above the small openings 31. These areas then become stages in a multi-stage distillation system.

A multi-stage flash distillation ("MSF") is typically a water desalination process that distills sea water by flashing a portion of the water into steam in multiple stages of what are essentially counter-current heat exchangers. In the embodiment shown in FIG. 3, each slanted baffle 30 acts as a separate concurrent heat exchanger where purified steam rises and contaminated fluids are removed as heavier contaminated fluids via the small openings 31. FIG. 3 shows in each plate section three separate flash chambers above the small openings 31 in a MSF system engineered inside a heat exchanger. In this embodiment each slanted baffle is a stage in the MSF process. Additional flow paths such as, tubing can be inserted to each slanted baffle stage to remove the purified vapor and remove the contaminated fluid.

Similar to FIG. 2, separate flow paths are created for the purified vapor 22. The purified vapor travels between the slanted baffles. The contaminated fluid is removed through the use of aligned holes in the slanted baffles. The baffles with the aligned holes can be placed in the plates or tubes of a standard heat exchanger.

The creation of sections of condensation and separate flow paths inside a heat exchanger avoids the need for additional equipment and less energy is used to create the steam to power traditional steam distillation processes. This results in reduced capital costs and reduced waste energy or energy costs in purifying fluids.

In one embodiment, at least some of the vapor stream is used to create additional vapor from the feed or contaminated stream by feeding or recycling the purified vapor stream through the heat exchanger without any multiple flow paths. Once the vapor stream is fully separated the vapor is purified water and thus there is no need to purify or separate the fluid stream any further. However, in one embodiment, the vapor may be separated into multiple streams by condensing or removing lower temperature distilled water from the vapor so the streams can be used more efficiently to transfer their heat energy to the heat exchanger or other processes, as needed. In this embodiment, the heat of condensation provides the heat of evaporation to the feed or contaminated stream inside the heat exchanger. The separation may be done through distillation columns or a plurality of flow paths using the density differences. In another embodiment, the condensing, evaporating and recycling steps are all done inside the heat exchanger. This condensing, evaporating and recycling of purified vapor can be part of the separation processes which can be done inside the heat exchange to further reduce capital costs and further reduce waste heat or kinetic energy of the fluids. For example, vertical runs of the heat exchanger can be engineered to have multiple outlets to serve as a distillation column removing vapor from condensed water.

Figure 4:
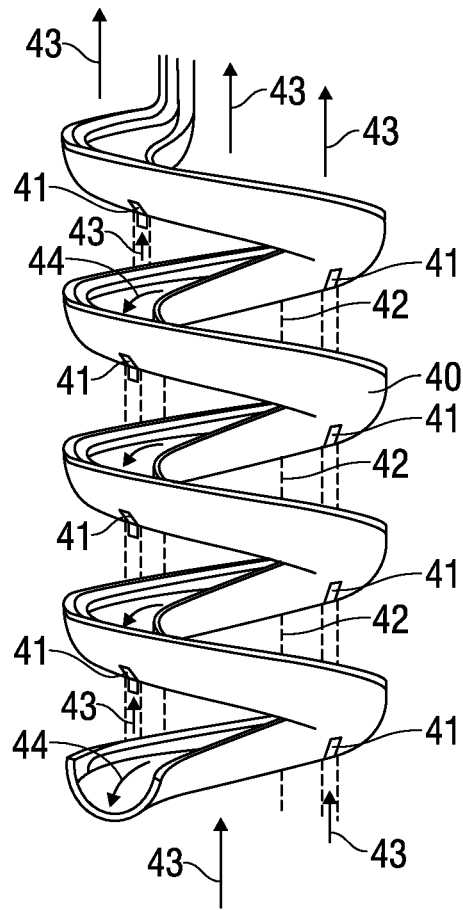
FIG. 4 illustrates an embodiment of this invention wherein half tubes that can be placed inside a heat exchanger have a conical shape condensation plate and the condensation plate has aligned holes in the middle and side to allow contaminated fluids and purified vapor to have separate flow paths respectively.

FIG. 4 shows a conical half tube embodiment. As shown in FIG. 4 a conical half tube 40 has aligned holes 41 and an opening in the middle 42. Multiple flow paths are created for the lighter vapor to rise 43 through the middle and the aligned holes and a flow path down 44 is created along the conical tube to allow the heavier containment fluid to flow unobstructed.

Figure 5:
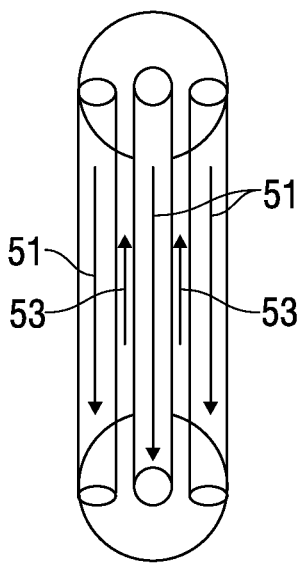
FIG. 5 is a cross section showing possible flow paths for the conical shape condensation plate in FIG. 4.

FIG. 5 is a cross section showing possible flow paths for the conical shape condensation plate 40 in FIG. 4. The flow paths for the contaminated fluid are shown as arrows 51 and the flow paths for the purified vapor are shown as arrows 53. This conical shape condensation plate can be engineered to be installed in most heat exchangers. A base pipe with the condensation plate inside can also be inserted in a heat exchanger.

In one embodiment, a combination of designs can be utilized to create multiple flow paths for the contaminated fluid and in some embodiments, multiple flow paths for the purified vapor. Persons skilled in the art, with the benefit of the disclosures herein, may choose the design or combination of designs best suited for the needs of the operator.

Pressure differences using pumps and other devices can further improve the apparatus and process. In this embodiment, pressure and gravity differences push the purified vapor upwards and cause the contaminated fluid to drop. In a more preferred embodiment, the baffles, screens and openings can be engineered to create interconnected compartments and each compartment will work as a flash distillation chamber in a MSF as discussed above. Finally, drains can be placed on the bottom to remove any heavy sediments and concentrated contaminated fluids. These drains can include valves or controlled openings to selectively remove the heavier fluids because of the increased contaminates.

In a preferred embodiment the amount of vapor separated is controlled to allow a preferred amount of purified vapor produced while minimizing the amount of energy loss from the contaminated fluid. This can be accomplished using three methods. First, the baffles can be adjusted to allow the water more time inside the apparatus which will allow the water to absorb more heat energy and allow a larger percentage of the contaminated fluid to be converted into purified vapor. Second, heated contaminated fluids can be recycled through the apparatus causing additional steam to be extracted from the water. Third, at least one path that is engineered to remove the contaminated fluids can be closed which will cause additional time in the heat exchanger resulting in more produced purified vapor. Valves, shunts, screens and any combinations thereof can be used to cause at least one path to be closed. Additional devices known to persons skilled in the art can be used.

A few selected openings, baffles, shunts, screens and combinations thereof can be engineered to create a series of connected sections and operate as a series of multiple flash distillation or MSF systems inside the heat exchanger. Each section will further purify the fluids as gravity causes the liquids with contaminates to separate and the lighter vapor moves to the next section with less contaminates. Lowering the pressure by attaching a pump on the outlet on the top of the heat exchanger can further increase the efficiency by causing the purified vapor to quickly exit the heat exchanger and lowering the boiling point of the fluid. In addition, pumping the contaminated fluid out can quickly remove the contaminated fluid with higher contamination levels. In the past efforts have focused on removing as much water as possible. Whereas, this inventive method works by quickly removing the steam from the contaminated water and allowing higher concentrations of contaminated water to be quickly removed once the levels become too high to no longer be efficient.

In a preferred embodiment, the process quickly takes the initial vapor produced and quickly removes the contaminated fluid such as, salt water. This improves efficiency because as contaminates content increases in the contaminated fluid so does the boiling point. The preferred process is to produce enough purified vapor to meet the required needs while minimizing the amount of energy the process takes. The higher boiling point of contaminated fluids with higher concentration of contaminates requires more energy which reduces the efficiency. In addition, the salt water requires more corrosion resistant material which increases the cost of any apparatuses necessary to utilize this invention. Accordingly, in this embodiment, the contaminated water is quickly removed from the purified steam. Therefore, minimal energy is wasted on the contaminated water and this also minimizes the additional expense of having too much of the material be highly corrosion resistant to impurities in the water. In situations wherein, purified water is not required, this invention can be used to prevent corrosion on the equipment used to produce steam. This will make the steam production more economical by reducing wasted energy on heating contaminates while also reducing the need for corrosion resistant materials.

Scaling:

As discussed previously, scaling is a major issue. In various embodiments, scaling can be controlled or minimized. In one embodiment, use of material that is resistant to scaling is used. U.S. Patent Application No. 2012/0118722A1 discloses many materials that are scale resistant. U.S. Patent Application No. 2012/0118722A1 is hereby incorporated by reference. In addition, nanoparticles that are resistant to scaling can be attached or sprayed on the equipment to prevent scaling.

In one embodiment, as discussed above and below, corrosion and scaling can be reduced using hydrophobic coating. For example, hydrophobic coating can be made from a nanoscopic surface layer that repels water, which is referred to as super hydrophic coating. Hydrophobic coating can be made from many different materials. The coating can be selected form the group consisting of Manganese oxide polystyrene (MnO2/PS) nanocomposite, Zinc oxide polystyrene (Zone/PS) nanocomposite, Precipitated calcium carbonate, Carbon nanotube structures, Silica nanocoating, and any combination thereof. Advances in three-dimensional ("3-D") printing technology can print a thin layer of hydrophobic coating on the equipment. Hydrophobic coating can be expensive and time consuming so persons skilled in the art would preferably only perform hydrophobic coating on equipment likely to suffer from corrosion and scaling such as, equipment in contact with high concentrations of impurities, for example, salt water. Using the multiple flow paths embodiments of the invention, it would be preferable to coat the contaminated water paths with hydrophic coatings but not the purified water paths as the purified water would cause little or no corrosion and/or scaling.

A 3-D Printer can be used to apply a thin layer of corrosion resistant material or paint on the interior of equipment subject to high concentrations of impurities, for example, salt water. Three-dimensional printing can also help with manufacturing the multiple flow paths inside equipment. In 3-D printing, additive processes are used, in which successive layers of material are laid down under computer control. These objects can be of almost any shape or geometry, and are produced from a 3-D model or other electronic data source. A 3-D printer is a type of industrial robot allowing manufacturing of complex design.

An additional embodiment of this invention, addresses the scaling issue by quickly removing the contaminated water. First, the purified vapor is quickly removed from the contaminated fluid by separate unobstructed flow paths. Pumps can be deployed to quickly extract the purified vapor from the contaminated fluid. The pumps can further create low pressure which will lower the boiling point and thus reduce the scaling issue as well as increase efficiency of the process. The advantages of lower pressure are further discussed below.

A third embodiment, requires multiple flow paths providing purified vapor and contaminated water several flow paths respectively minimizing resistance. This embodiment also has an advantage of if one flow path becomes blocked with contaminates or scaling, the process can continue with the alternative flow paths. One option is to create a maze design, as discussed below.

In a fourth embodiment, the concentration of salts and other contaminates are controlled so that the contaminated fluid is removed before the concentration gets too high and scaling becomes a major issue. This can be accomplished by attaching pumps at the contaminated fluid outlet to quickly remove contaminates. Furthermore, additional drains can be placed in the apparatus to quickly remove heavier contaminated fluids with higher concentrations. In this embodiment, synergistic benefits include less scaling, less corrosion and less energy needed to heat higher concentrations of contaminated fluids. A person skilled in the art can use the apparatus disclose herein to reduce scaling and reduce corrosion as separate and distinct benefits.

In a fifth embodiment, purified fluid or fluids with lower levels of contaminates is run through the apparatus to dissolve contaminates and remove the scaling. The purified fluid or fluids with lower contaminates can be run intermittently on a schedule or as necessary, to remove scaling.

Maze Design:

In one embodiment, purified vapor is extracted and separated by use of a maze design. This design incorporates a maze design to constrain contaminated fluids while letting the lighter vapor pass through without interrupting production. In a preferred embodiment, a screen contains a series of compartments along a selectively perforated base pipe inside the screen that allows alternative path flows.

In an even more preferred embodiment, each compartment contains a primary screen, outer housing, flow baffles, and a secondary screen. This embodiment, create numerous or at least three or more interconnected alternative flow paths.

Figure 6:
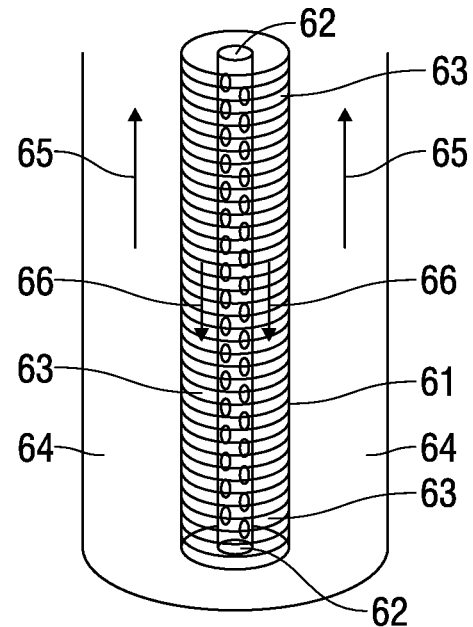
FIG. 6 is a flow chart showing perforated tubing with screens to create a plurality of flow paths.

FIG. 6 is an illustration of the maze design embodiment. This figure shows a perforated pipe 60 with at least one screen 61. This creates three separate flow paths. The three paths are inside the perforated pipe 62, inside the screen but outside the perforated pipe 63 and outside the screen but inside the apparatus 64 such as, heat exchanger. Additional baffles screens and pipes may be added as necessary to increase flow and increase flow paths. The proposed flow paths for the purified vapor is shown as arrow 65 and for the contaminated fluid as arrow 66 in FIG. 6.

Fluids and vapor flow into the primary screen and then are redistributed by the flow baffles. The vapor, which now flows more uniformly, travels through the secondary screen and into the perforated base pipe where it commingles with produced vapor from other compartments. The increased resistance from the screens and flow baffles will allow gravity to separate the heavier contaminated fluid from the lighter vapor. An additional benefit of the maze design is if one path gets obstructed with contaminates, the fluid and vapor flow is then diverted to the adjacent undamaged-screen compartments. Persons skilled in the art will use fluid flow dynamics, to preferably engineer the maze design to achieve the greatest efficiency based on various variables. These variables include fluid type, type and amount of contaminates, energy source and costs, fluid loading, thermodynamics, amount of desired fluid flow and desired purified vapor production among other factors known to persons skilled in the art.

Low-Temperature Thermal Desalination:

Another embodiment is to use pressure gradients in the apparatus to create additional efficiencies. Low-temperature thermal desalination ("LTTD") takes advantage of water boiling at low pressures. In one embodiment, vacuum pumps create a low-pressure, lower temperature environment in which water boils at a temperature gradient of as low as 1-2° C., typically 8-10° C. and as much as 20° C. or more between two volumes of water. This cold water is pumped through coils to condense the water vapor. The resulting condensate is purified water. In this embodiment cold water will be pumped through the vapor to further condense and purify the water vapor. In a preferred embodiment the LTTD can be combined with the standard heat exchanger modified with this claimed invention to create additional efficiencies. The LTTD can be engineered inside or outside the heat exchanger. In this embodiment, purified water vapor is created at temperatures less than 100° C., more preferably less than 90° C. and even more preferably less than 80° C. and most preferably less than 70° C. In this embodiment, the pumps create a low-pressure area inside the heat exchanger of less than 1 bar, more preferably less than 0.9 bar, even more preferably less than 0.8 bar and most preferably less than 0.7 bar.

In one embodiment, periodic colder water of at least 1 Celsius and less than 20 Celsius can be used to create a temperature gradient. In one embodiment, cold or room temperature water would be periodically pumped through the system. A series of apparatuses or heat exchangers described above could be used.

When a heat exchanger is not needed, lower temperature water would then be sent through the system to keep the purification ongoing despite the heat exchanger not being needed. A computer control, as disclosed below, would determine the optimum fluid streams and temperature to get the most efficient purification based on temperature differences and contamination levels. Valves can control the water streams running through the heat exchangers to get the most beneficent thermal desalination by combining different streams of fluid or water temperature. This process would be most efficient for industrial processes that require cooling as the cooling water can be used to create at least part of the heat energy for the fluid purification process. Some power plants, such as, nuclear power require large cooling towers to reduce the water temperature. This presents an opportunity to use the heat energy released from cooling the water using the purification process described above. In one embodiment, the cooling tower can be retrofitted or engineered to have at least one or a plurality of heat exchangers that uses the heat energy of water to distill water by vaporizing the water. Condensation can also be used to improve the efficiency of the water purification process. In this embodiment, additional flow paths would be created to remove pure condensation throughout the process. Furthermore, air or water flowing through the process, either directly or indirectly can be adjusted to maximize water condensation.

Control Panel:

In one embodiment, a control system is provided with the apparatus to obtain favorable operation and performance of the apparatus. Factors to be considered for favorable operation of the apparatus and system include, but are not limited to: energy costs, amount, cost and quality of fresh water and contaminated fluid available, water demand and consumption, amount of cooling or heating needed by the water, fluctuations in water and energy demands, amount of excess heat, cooling or energy available, design of the equipment, operational conditions of the equipment, water temperatures of a plurality of fluid streams, and differences between the streams of water.

Figure 8:
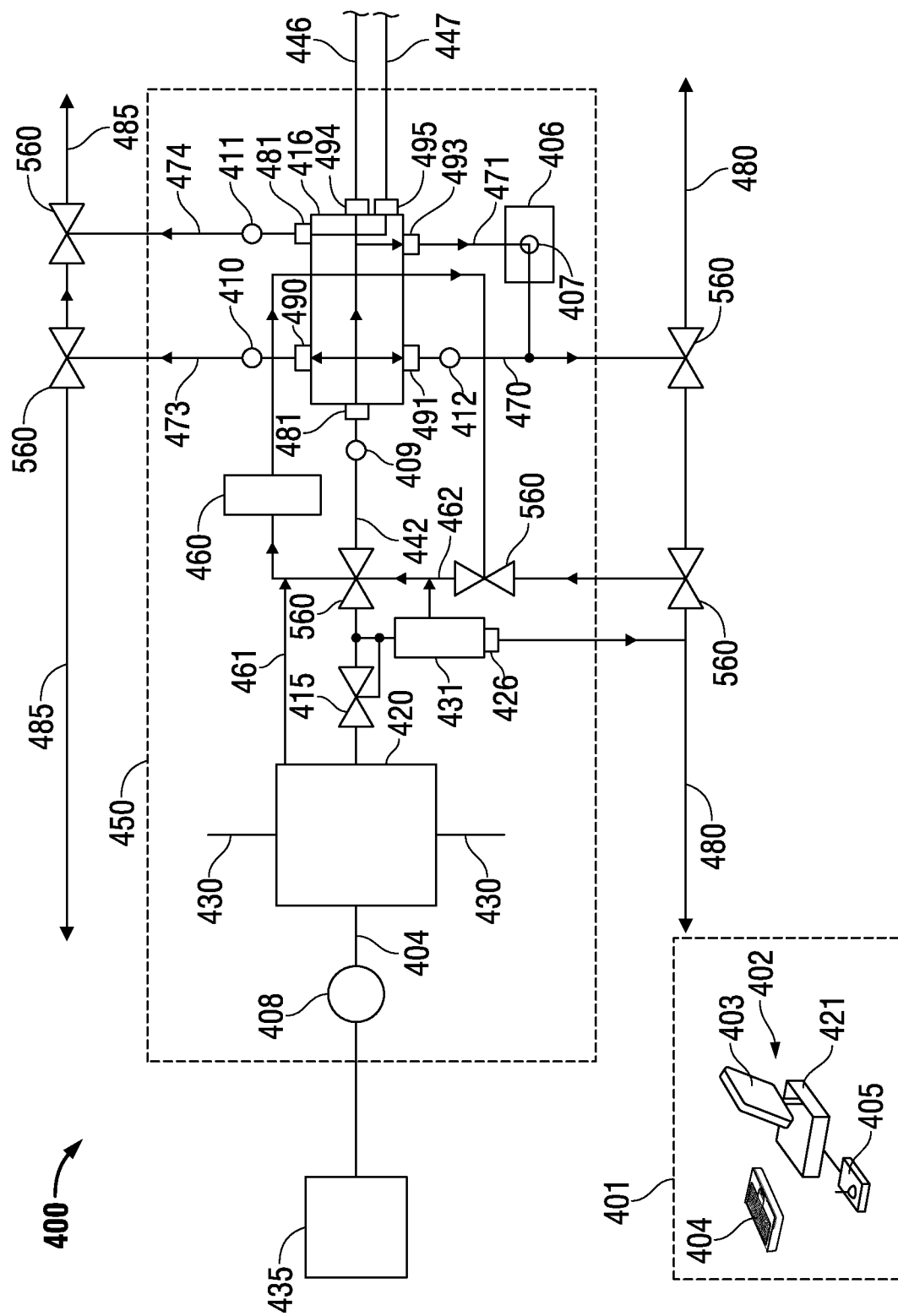
FIG. 8 is a flow chart showing a SCADA control system embodiment of this invention.

FIG. 8 further shows a schematic of a water purification apparatus and system 400 including a control center 401. In one embodiment, the controls can be standard manual or even automated controls. However, the purification system can achieve even greater efficiencies and improved performance by using more advanced control systems, which may include a signal capture and data acquisition ("SCADA") system 402. SCADA is also an acronym for supervisory control and data acquisition, a computer system for gathering and analyzing real time data. SCADA systems are used to monitor and control a plant or equipment in industries such as telecommunications, water and waste control, energy, oil and gas refining and transportation. A SCADA system gathers information, such as sensors or gauges, transfers the information back to a central site, alerting central site of the information, carrying out necessary analysis and control, such as determining if the changes are advantageous or necessary, and displaying the information in a logical and organized fashion. SCADA systems can be relatively simple, such as one that monitors environmental conditions of a small building, or complex, such as a system that monitors all the activity in a nuclear power plant or the activity of a municipal water system. In addition, recent improvements in computer power and software configurations allows entire systems to be operated in real time with or without human interaction. The real-time capabilities allow the control system to make decisions based on multiple factors and operate the water purification system favorable with little or no operator interaction.

Persons skilled in the art, with the benefit of the disclosure herein, would recognize similar monitoring and/or control systems that can be operatively connected therewith the disclosed apparatus and which may thus be used in conjunction with the overall operation of the system 400. The SCADA control system 402 which is shown as a computer 421 with a display panel 403, keyboard 404, and wireless router 405, may include any manner of industrial control systems or other computer control systems that monitor and control operation of the system. In one embodiment, the SCADA system 402 may be configured to provide monitoring and autonomous operation of the system 400.

The SCADA controlled system 402 may be interfaced from any location on the apparatus, such as from an interface terminal 406. The interface terminal can include, cellular or satellite communication equipment, a wired or wireless router, servers or traditional wired connections, and any combinations thereof. In the embodiment shown in FIG. 8, a sensor 407 is connected to the interface terminal 406. In an embodiment, the SCADA system including a portion or all the interface equipment and controls can be on an operations section of the apparatus. Additionally, alternatively or as a backup, the SCADA controlled system 402 may be interfaced remotely, such as via an internet connection that is external to the apparatus. A usable internet interface may include a viewer or other comparable display device, whereby the viewer may display real-time system performance data. In other embodiments, the SCADA system 402 may be able to transfer data to spreadsheet software, such as Microsoft Excel. The data may be related to temperature, salinity, excess heat or cooling needs, excess energy or co-generations from industrial processes, pressure, flow rate, fluid levels, and/or other similar operational characteristics of the system 400.

The operations of the system 400 may utilize many indicators or sensors, such as cameras including infrared cameras, ultrasonic sensors, sight glasses, liquid floats, temperature gauges or thermocouples, pressure transducers, etc. In addition, the system 400 may include various meters, recorders, and other monitoring devices, as would be apparent to one of ordinary skill in the art. Sensors 407, 408, 409, 410 411, and 412 are shown in FIG. 8. These sensors, shown in FIG. 8, are for the following, initial feed stream 404, feed stream 442 before entering the heat exchanger 416, first purified vapor exit stream 473, second purified vapor exit stream 474, first contaminated fluid output 470, second contaminated fluid output 471, respectively shown as 408, 409, 410, 411, 412 and 407. These devices may be utilized to measure and record data, such as the quantity and/or quality of the intake fluids, the liquid phase(s) in the apparatus, and the vapor or water produced by the system 400.

The SCADA control system 402 may provide an operator or control system with real-time information regarding the performance of the apparatus 400. It should be understood that any components, sensors, etc. of the SCADA system 400 may be interconnected with any other components or sub-components of the apparatus or system 400. As such, the SCADA system 402 can enable on-site and/or remote control of the apparatus 400, and in an embodiment, the SCADA system 402 can be configured to operate without human intervention, such as through automatic actuation of the system components responsive certain measurements and/or conditions and/or use of passive emergency systems. In another embodiment, the system can operate in real-time wherein a plurality of factors or all relevant factors are instantaneously or nearly instantaneously determined and used to calculate the most favorable operations. This real-time operation allows all components to be operated in a coordinated manner based on variables as received in real time or instantaneously or nearly instantaneously.

The system 400 may be configured with devices to measure "HI" and/or "LOW" temperatures, density, pressure or flow rates. The use of such information may be useful as an indication of whether use of additional heat or a compressor in conjunction with the apparatus is necessary, or as an indication for determining whether the fluid flow rate should be increased or decreased. Alternatively, the information could be used to determine which fluid streams would create the most advantageous temperature differentials for creating water vapor and decide where and when to recycle or dispose of each stream. The system 400 may also be coupled with heat, pressure, and liquid level safety shutdown devices, which may be accessible from remote locations, such as the industrial energy or external heat source (not shown).

The SCADA system 402 may include a number of subsystems, including manual or electronic interfaces, such as a human-machine interface (HMI). The HMI may be used to provide process data to an operator, and as such, the operator may be able to interact with, monitor, and control the apparatus 400. In addition, the SCADA system 402 may include a master or supervisory computer system such as, a server or networked computer system, configured to gather and acquire system data, and to send and receive control instructions, independent of human interaction such as real time, as described below. A communication device or port or remote terminal ("RT") may also be operably connected with various sensors. In an embodiment, the RT may be used to convert sensor data to digital data, and then transmit the digital data to the computer system. As such, there may be a communication connection between the supervisory system to the RT's. Programmable logic controllers ("PLC") may also be used to create a favorable control system. In FIG. 8, the RT and PLC would most likely, but would not necessarily, be located in the interface terminal 406

Data acquisition of the system may be initiated at the RT and/or PLC level, and may include, for example, gauges or meter readings such as, temperature, pressure, density, equipment status reports, etc., which may be communicated to the SCADA 402, as requested or required. The requested and/or acquired data may then be compiled and formatted in such a way that an operator using the HMI may be able to make command decisions to effectively run the apparatus or system 400 at great efficiency and optimization. This compilation and formatting of data can be used to enable real-time operations, as discussed below.

In an embodiment, all operations of the system 400 may be monitored via control system 401 or in a control room within the operations section 450. In an embodiment, the operations section 450 may be mounted on the neck of a trailer. Alternatively, or additionally, the system 400 can be operable remotely and/or automatically.

In one embodiment, the entire operations section of the apparatus can fit on a mobile skid usable within the scope of the present disclosure. Specifically, all equipment including the SCADA control system 402 can be located on a single skid such as, a mobile trailer or modified truck.

Various embodiments of system 400 can include various separators. For example, an initial two- or three-phase separator (If vapors need to be removed) 420 is shown, which can be configured to receive an input stream 404 (for example, a contaminated water stream) which can be at a high pressure through the use of pumps or pressure or gravity to create efficiency. The separator 420 can be used to receive one or more streams 430 from the input stream 404 provided by source 435 to remove solid contaminates, which is removed from the process using devices known in the art such as, a dump valve 415.

Excess heat or multiple streams of water with differential temperatures can be introduced into the heat exchanger 416 through inlet 481. As described above, in the heat exchanger, at least a portion of the purified water is removed from the contaminated water. This removal is done in the heat exchanger by using density differences between the purified water vapor created and the heavier contaminated fluid. FIG. 8 shows a first contaminated fluid exit stream 470 and a second contaminated fluid exit stream 471 exiting heat exchanger 416 through outlets 491 and 493 respectively. The contaminated fluid streams 470 and 471 that exit outlets 491 and 493 are then combined with contaminated fluid line 480. Alternatively, valves or similar devices 560 can recycle the contaminated water through the line heater 460 and/or heat exchanger 416 to obtain favorable operating conditions through heat exchanger 416. Using a plurality of flow paths and/or internal condensation sections, the purified water is removed using a first purified water discharge stream 473 through outlet 490 and a second purified water discharge stream 446 through outlet 494.

In the embodiment shown in FIG. 8, the first purified water discharge stream 473 through outlet 490 is sent to purified combined line 485. Valves 560 control the flow direction of first purified water discharge stream 473 and whether first purified water flow stream is recycled 474 through the heat exchanger 416 through inlet 481 to transfer heat energy to heat exchanger 412 and then exits through outlet 495 as purified water 447 through outlet 495. An additional or a plurality of recycling lines, of at least two or more, can be engineered into the heat exchanger 412 and/or adding additional heat exchangers (not shown) that can be used in series or parallel. The additional recycling lines and heat exchangers permit additional recycling options and heat transfer options. Persons skilled in the art, with the benefit of the disclosures herein would know how to engineer the additional lines to achieve favorable results.

As discussed above, both the purified water streams and contaminated water streams can be recycled though the heat exchanger 416 to obtain favorable conditions including water temperature differentials to create water vapor. In addition, pressure differences of the water, or other fluids flowing to and/or from the apparatus can be used to favorably move the water and vapor with little or no use of pumps. Purified water separated from flow streams within the system 400 can be transported and/or released from the heat exchanger 416 using one or a plurality of more purified water or vapor outlet ports such as, 490, 494 and 495 for exiting purified streams 473, 446 and 447 respectively. Similarly, purified water, stream 485 can be flowed into or from the system 400 and/or otherwise controlled using a water valve or ports 560, and contaminated fluid streams 480 can be flowed into or from the system 400 using one or a plurality of valves or port 560. As described previously, both the contaminated streams and purified water streams can be flowed from the system 400 into tanks, header lines, sales lines, or similar vessels and/or conduits which are not shown but easily understood in the art.

An embodiment of the system 400 is also shown including a filter or solid separator 431, such as, a sand separator, which can be used to separate solids (e.g., sand and/or other entrained particles) from one or more flow streams within the system 400. Separated sand and/or other solids and/or slurries can be removed from the system via an exit such as, a dump port 426 and sent to contaminated stream 480. In this embodiment, solids are removed before the fluids are subject to heat energy to efficiently use the heat energy to create vapor.

In FIG. 8, a fluid purification apparatus is shown including a line heater 460, usable to heat flow streams received from the first three-phase separator 420 and/or other recycled streams within the system 400, and a purified water and waste fluid discharges and related equipment for use of processing, measuring, and removing from the apparatus one or more flow streams.

It should be understood that the depicted embodiment is merely exemplary, and that various types and quantities of separators and other components can be connected, as needed, to effectively separate and process a desired input stream, and provided with any manner of gauges and/or other measurement devices.

Synergy with Alternative Energy Sources:

Many alternative energy sources have the problem of not providing consistent energy production or the ability to manage energy production efficiently. This process, using a control system or the SCADA system described above can fix the problem by providing efficient energy production by combining the water generation with other alternative energies. For example, wind power only provides power during significant wind and solar power provides only energy during sunlight.

Combining the water production during excess power or heat consumption using alternative energy such, as wind, solar, geothermal, hydroelectric, wave energy, or battery or other heat or energy storage systems, could make alternative energy more cost effective with other energy sources.

Single-Skid Embodiment

In one embodiment, at least one separator, heat source, such as, excess heat, line heater, heat exchangers, and all conduits necessary to interconnect these components, as well as each of the external valves and/or ports that provide discharge of waste fluid 480 and removal of purified water (485, 446, and 447), can be provided on a single mobile member 450, such as, a movable trailer. SCADA monitoring devices such as sensors, 407, 408, 409, 410, 411, and 412 are also shown in association with various system components; however, control and/or monitoring devices can be provided in association with any portion of the system 400 and can be controlled on-site, such as through use of controls within the operations section 450. In FIG. 8, the controls are shown as a remote computer 401 but can be a cabin area within the movable trailer having solar panels thereon, remotely (such as, cellular or internet interface), and/or automatically, such as through use of automated controls that operate responsive to predetermined conditions, coupled with emergency systems to automatically cease operation of certain components if needed.

Embodiments disclosed herein thereby include systems and methods for performing a purification process, that require only a single mobile member, having most or all the equipment necessary for the separation process operably interconnected upon arrival. As such, assembly or rig-up and disassembly or de-rig times for the present system can be far less than conventional systems, which can require a full day or longer to assemble. Embodiments described herein can be assembled and used in 50%, 75%, and 90% less time than that required to rig up a conventional system. Further, the transportation time and costs associated with a single-skid unit are drastically reduced when compared with those associated with conventional fluid purification systems.

Drilling Embodiment:

In one embodiment, the apparatus and method can be used on an oil and gas well site, or even geothermal sites. The energy source can be heat generated by flare gas or heat energy from wellbore operations such as, steam and gravity assisted operations. Using this system, water intensive operations such as, fracking, Steam and Gravity Drainage (SAGD), and water flooding can use the process to use contaminated water with the additional benefit of having purified water as a product.

Modeling Embodiment:

In one embodiment the control system or SCADA system could be used to run fluid modeling on a water purification apparatus or even test a model for changes or improvements in the system. This model could involve several steps.

1) Run the system using normal operations or have SCADA record operational conditions during regular operations 2) Run fluid modeling and heat transfer modeling software to determine which designs works best.

3) Adjust parameters such as heat, pressure and throughput to achieve the best efficiencies.

4) Model various process using known adjustment variables to display the best possible parameters for the entire process. For example, designs can be tweaked to adjust tubing sizes and openings.

Transportation Efficiency Embodiment

Embodiments disclosed herein may beneficially provide industrial heat processes, the ability to use a single-skid unit that does not require a series of trailers or trucks to be connected on location. This provides a safer system by minimizing piping between high-pressure equipment. Additional benefits include: purified water and waste water may be readily measured, and fluids may be separated more efficiently and accurately. The single skid mobile unit may be cost-effectively deployed, and may provide all necessary unit operations to purify water on a single unit, which provides an advantage over the use of multiple units, skids or train of trucks at a work site. Reduced transport efficiencies including reduction in rail, water and truck traffic can reduce the costs of transportation including reduced energy including fuel consumption, reduced accidental discharges, as well as reduced wear and tear on highways and local roads. In one embodiment, the entire system can be engineered to fit into a single container unit that can be easily transported, via ship, rail, or truck. In another embodiment, the unit on a skid can be engineered to fit inside a container for quick transport.

Additional Embodiments

As discussed above, embodiments disclosed herein can also provide for continuous, real-time monitoring, enabling efficient control of the purification from an on-site location and/or a remote location. The system can also be configured for autonomous, unmanned operation, providing a significant savings in cost and manpower. In another embodiment, the system can be coupled with electrical generators to provide purified water in disaster relief operations, or military preparation where electricity and water is needed in emergency or remote situations. In one embodiment, the generator can be on one mobile skid and attached to a second mobile skid to provide water purification including pumps for pumping contaminated fluids and removing waste fluids and purified water. In addition, the mobile skid embodiment can be brought to areas with severe water demand or water drought conditions to help run industrial processes during peak demand or water scarcity times. Otherwise, human demand might override industrial water usage and require shutdown of industrial processes versus just adding a single trailer or system to purify at least a portion of the water usage or all the water usage depending on the situation. Therefore, this system provides capabilities not currently available for operators of industrial processes, drilling operations, military operations during water droughts, natural and man-made disasters and other emergencies.

Vapor-Compression Evaporation System:

Vapor-compression evaporation comprises an evaporation method. The apparatus can comprise a blower, compressor or jet ejector utilized to compress, and thus, increase the pressure of the vapor produced. The pressure increase of the vapor also generates an increase in the condensation temperature. The same vapor can serve as the heating medium for the liquid or solution being concentrated ("contaminated fluid" of "mother fluid") from which the vapor was generated to begin with. If no compression was provided, the vapor would be approximately the same temperature as the boiling liquid/solution, and thus, no heat transfer takes place. If compression is performed by a mechanically driven compressor or blower, this evaporation process is referred to as MVR (Mechanical Vapor Recompression) and if compression performed by high pressure motive steam ejectors, the process is sometimes called Thermo-compression or Steam Compression which requires the use of a steam ejector.

U.S. Pat. Nos. 7,708,665 and 7,251,944 describe vapor compression extraction methods and systems. Both U.S. Pat. Nos. 7,708,665 and 7,251,944 are hereby incorporated by reference.

The inventive concepts, discussed above, including but not limited to using multiple flow paths to allow gravity to separate the purified vapor and/or using the internal components of a heat exchanger to serve the function as a flash chamber can be applied to vapor compressions systems to produce water. A vapor-compression evaporation system, comprising a plurality of heat exchangers in series each containing a feed having a nonvolatile component; at least one heat exchanger comprising a plurality of flow paths wherein gravity differences separates the heavier contaminated fluid from the lighter purified water vapor; a mechanical compressor coupled to the last vessel in the series and operable to receive a vapor from the last vessel in the series; a pump operable to deliver a cooling liquid to the mechanical compressor; a tank coupled to the mechanical compressor and operable to separate liquid and vapor received from the mechanical compressor; a plurality of vessels inside respective vessels, the vessel in the first heat exchanger in the series operable to receive the vapor from the heat exchanger, at least some of the vapor condensing therein, whereby the heat of condensation provides the heat of evaporation to the first heat exchanger in the series; wherein at least some of the vapor inside the first vessel in the series is delivered to the heat exchanger in the next vessel in the series, whereby the condensing, evaporating, and delivering steps continue until the last vessel in the series is reached. In one embodiment, the system further comprises a multi-effect or a multi-stage flash evaporator coupled to the last heat exchanger in the series for additional evaporation of the feed or alternatively inside the heat exchangers.

The foregoing description of preferred and other embodiments is not intended to limit or restrict the scope or applicability of the inventive concepts conceived of by the applicants. In exchange for disclosing the inventive concepts contained herein, the applicants desire all patent rights afforded by the appended claims. Therefore, it is intended that the appended claims include all modifications and alterations to the full extent that they come within the scope of the following claims or the equivalents thereof.

EXAMPLE

Hypothetical examples are disclosed below to illustrate the invention. Persons skilled in the art will recognize many different variations of these hypotheticals based on the disclosure in this document and known prior art. All variations are intended to be within the scope of this invention. Therefore, the examples disclosed are not intended to limit the scope of the claims.

Figure 7:
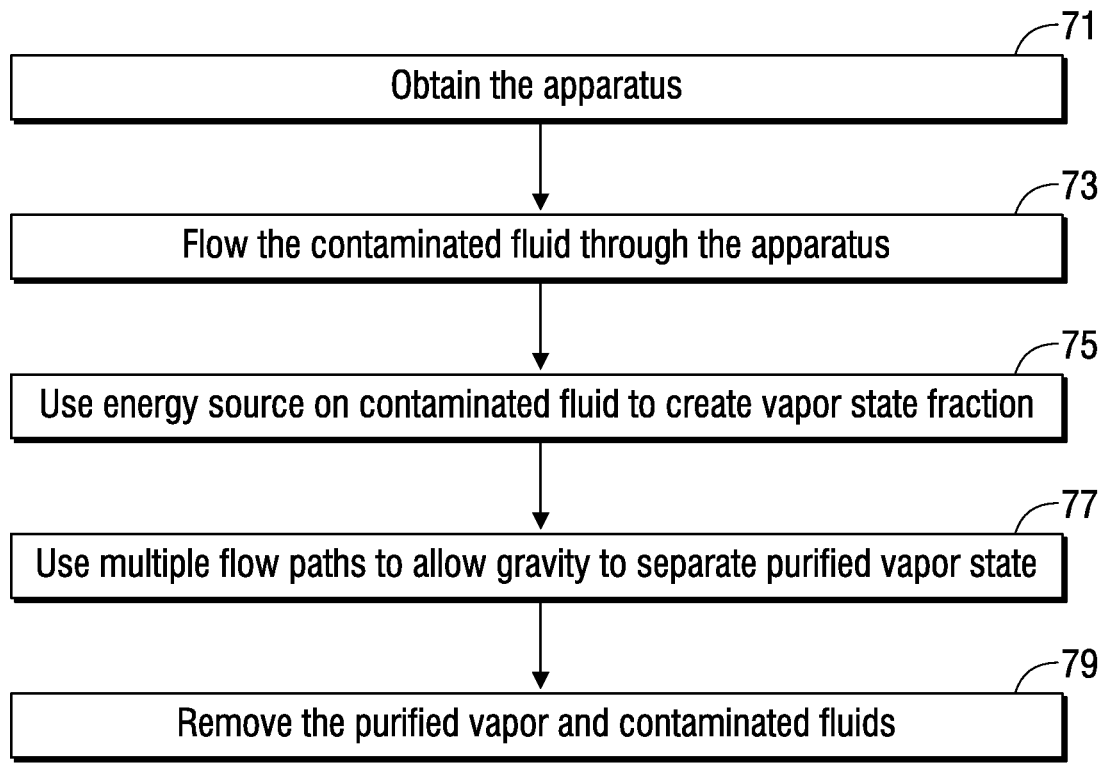
FIG. 7 is a flow chart showing a method embodiment of this invention.

FIG. 7 illustrates the steps of one embodiment. The first step is to obtain the apparatus 71. The apparatus has at least one inlet and at least two outlets connected to an energy source that can concentrate energy on a contaminated fluid. The second step is to flow the contaminated fluid through the inlet into the apparatus 73. The third step is to use the energy source on the contaminated fluid 75. This causes at least a portion of the contaminated water to change into a purified vapor state inside the apparatus. The fourth step is to use multiples flow paths inside the apparatus 77. The effects of gravity separate at least a portion of the heavier contaminated fluid from the lighter purified vapor state. The fifth step is to remove the purified vapor and contaminated fluids 79. This step is accomplished by flowing the purified vapor state through a first outlet and flowing the contaminated fluid after a portion of fluid has been removed as a purified vapor state through a second outlet of the apparatus.

In this hypothetical example, salt water with 30 g/l of NaCl with a boiling point of 105° C. is pumped into the heat exchanger which is heated by excess gas from a heat recovery for steam generation system ("HRSG"). The heated gas is flowed in and out of the heat exchanger to provide the energy to boil the salt water. The salt water is pumped into the heat exchanger and is heated by the hot air gas from the HRSG. Once the salt water obtains a temperature of 105° C. the salt water begins to boil into a purified vapor or steam. The purified steam rises in the heat exchanger as it is lighter than the salt water. The slanted baffles inside the heat exchanger cause the purified steam to collect in chambers formed by the slanted baffles. Pressure from additional steam creation pushes the steam further up into the next chamber formed by another slanted baffle.

Any heavier contaminated water caught in the vapor flows down through the hole back into the initial salt water feed stream. The water flowing down has a separate flow path from the rising steam to reduce friction and prevent contamination of the purified rising steam. The flowing water also collects contaminates that has participated out from the salt water. The salt water with the removed purified vapor component then exits from the first outlet. This heated salt water with a higher concentration of salt can be used to pre-warm feed salt water with a pre-warmer heat exchanger before it enters the heat exchanger for purification to increase efficiency.

After the purified steam has reached the maximum level in the heat exchanger it exits the heat exchanger. The purified steam can then be used for further work such as steam turbine generation or can be run through additional prior art heat exchangers to efficiently increase heat energy and pressure to further add energy before using the steam. Alternatively, the vapor can be directly cooled and condensed into fresh water. To further improve the efficiency and lower the boiling temperature a pump is connected to the second outlet which lowers the pressure in the upper part of the heat exchanger. Pumps pump out the purified vapor creating a pressure less than 1 bar inside the heat exchanger which lowers the boiling point of the saltwater, reduces scaling and makes the process more efficient.

In a more preferred embodiment, the pressure is lower on the top of the heat exchanger to quickly remove the steam from the water. In addition, pump(s) can be attached to the first outlet to quickly pump the water out. The best efficiencies occur when the pressure at the top of the heat exchanger is kept below atmospheric pressure of less than 1 bar and the flow rate of the water is high enough to quickly remove water with higher salt concentrations to prevent the boiling point from increasing too much because of the increased concentration of salt. This also reduces scaling. If scaling becomes a problem, purified water is run through the system to remove the contaminates and scaling. Running purified water allows the equipment to be cleaned of scaling without stopping the production of steam.

This invention can be used in just about any heat exchanger or similar application. Such applications include but are not limited to space heating, refrigeration, air conditioning, power plants, chemical plants, petrochemical plants, petroleum refineries, natural gas processing, and sewage treatment.

The invention claimed is:

1. An apparatus comprising:
   a. a water desalination apparatus, the water desalination apparatus comprising an inlet wherein water containing salts flows in the water desalination apparatus through the inlet;
   b. at least two outlets on the water desalination apparatus, wherein a first outlet exits purified vapor and a second outlet wherein the water containing salts with a portion removed as purified vapor exits the water desalination apparatus;
   c. solar energy that is connected to the water desalination equipment, wherein the solar energy causes the water containing salts in the water desalination apparatus to heat to a temperature wherein a portion of the water containing salts is converted to purified vapor;
   d. at least two different flow paths, a first flow path connecting at least one inlet to the first outlet and a second flow path connecting the inlet to the second outlet, the first and second flow paths flow through at least a portion of the water desalination apparatus wherein density differences causes the purified vapor to take a different path than the water containing salts with the purified vapor exiting the first outlet and the water containing salts exiting the second outlet; and
   e. a condensation section comprising at least one flow path wherein the purified vapor is condensed into purified water.

2. The apparatus of claim 1 wherein the water desalination apparatus comprises a heat exchanger in operative connection with the solar energy source, wherein the solar energy source provides the heat energy for distilling and separating salts from the water containing salts inside the heat exchanger.

3. The apparatus of claim 1 further comprising at least one sensor for determining saltwater concentration in the water containing salts in the apparatus.

4. The apparatus of claim 1 further comprising pressure differences inside the desalination apparatus wherein pressure differences between the purified vapor and the water containing salts is utilized to separate the water containing salts from the purified vapor.

5. The apparatus of claim 1 wherein the apparatus is on a single skid, wherein the single skid comprises a solar panel.

6. The apparatus of claim 1 further comprising a membrane.

7. The apparatus of claim 1 wherein the purified vapor outlet is connected to a second device that uses heat energy from the purified vapor.

8. The apparatus of claim 1 further comprising an additional flow path, wherein the additional flow path is selected from valves, tubes, screens, perforated pipes or combinations thereof.

9. The apparatus of claim 7 wherein the second device is a heat exchanger that uses the heat energy from the purified vapor to pre-warm the feed water containing salts flowing into the water desalination apparatus.

10. The apparatus of claim 1 further comprising a conical section in a vertical run of the water desalination apparatus, wherein the conical section comprises a plurality of holes creating multiple flow paths.

11. The apparatus of claim 1 further comprising at least one perforated pipe inside the water desalination apparatus creating multiple flow zones inside the water desalination apparatus.

12. The apparatus of claim 1 further comprising at least one sensor and at least one valve connected to a control panel for operating the water desalination apparatus.

13. The apparatus of claim 5 wherein the solar energy source is from the solar panel on the skid.

14. The apparatus of claim 1 further comprising a filter for removing solids before the contaminated fluid flows into the inlet.

15. The apparatus of claim 1 further comprising pumps attached to the first and second outlets.

16. A method to purify fluid comprising:
   a. obtaining an apparatus with at least one inlet and at least two outlets connected to a solar energy source, wherein the solar energy source can be concentrated onto the contaminated fluid;
   b. flowing the contaminated fluid through the inlet into the apparatus;
   c. using the solar energy source on the contaminated fluid inside the apparatus to cause at least a portion of the contaminated fluid to change into purified vapor inside the apparatus;
   d. using at least two flow paths inside a distillation column inside the apparatus wherein density differences separates at least a portion of the contaminated fluid from the purified vapor;
   e. flowing the purified vapor through the first outlet and flowing the contaminated fluid after a portion of fluid has been removed as the purified vapor through the second outlet of the apparatus; and
   f. condensing the purified vapor into purified water.

17. The method of claim 16 wherein the apparatus is a heat exchanger.

18. The method of claim 16 further comprising using the purified vapor to pre-warm the contaminated fluid before flowing through the inlet into the apparatus.

19. The method of claim 16 further comprising placing the apparatus at an oil and gas well site and purifying water at the oil and gas wellsite.

20. The method of claim 16 further comprising using the purified water at the oil and gas well site.

21. The method of claim 16 further comprising removing solids before the contaminated fluid flows into the inlet.

22. The method of claim 16 further comprising attaching pumps at the first and second outlets and pumping the contaminated fluid and purified vapor out of the apparatus.

23. A solar desalination system comprising
   a. an inlet wherein contaminated fluid flows in the apparatus through the inlet;
   b. at least two outlets wherein a first outlet exits purified vapor and a second outlet wherein contaminated fluid with a portion removed as purified vapor exits the apparatus;
   c. solar energy that causes the contaminated fluid to heat to a temperature wherein a portion of the contaminated fluid is converted to purified vapor;
   d. at least two different flow paths, a first flow path connecting at least one inlet to the first outlet and a second flow path connecting the inlet to the second outlet, the first and second flow paths flow through at least a portion of the apparatus wherein density differences causes purified vapor to take a different path than the contaminated fluid with the purified vapor exiting the first outlet and the contaminated fluid exiting the second outlet;
   e. at least one sensor on the apparatus and at least one valve on the system; and
   f. at least one control panel uses the at least one sensor and the at least one valve to operate the apparatus.

24. A method for desalinating contaminated water at an oil and gas well site comprising:
   a. providing an apparatus at an oil and gas well site, the apparatus comprising: an inlet wherein the contaminated water flows in the apparatus through the inlet; at least two outlets wherein a first outlet exits purified vapor and a second outlet wherein a component of the contaminated water with a portion removed as purified vapor exits the apparatus; an energy source that causes the contaminated water to heat to a temperature wherein a portion of the contaminated water is converted to purified vapor;
   b. flowing contaminated water from an oil and gas well site through the inlet of the apparatus;
   c. heating the contaminated water using solar energy to a temperature wherein a portion of the contaminated water is converted to a purified vapor component inside the apparatus;
   d. separating the purified vapor component of the contaminated water from the contaminated water component inside the apparatus by providing at least two different flow paths connecting the inlet to the first outlet;
   e. exiting the purified vapor component from the first outlet;
   f. exiting the contaminated water with a portion removed as the purified vapor component from the second outlet; and
   g. condensing the purified vapor component into purified water.

25. The method of claim 24, further comprising using the purified water at the oil and gas well site.

26. The method of claim 25, further comprising using density differences and alternative flow paths to separate the purified vapor component which is heavier than the contaminated water.

27. The method of claim 24, further comprising using vapor compression for separating the purified vapor component from the contaminated water.

28. The method of claim 24, further comprising creating a pressure less than 1 bar inside the apparatus.

29. The method of claim 24, further comprising using a heat exchanger to transfer heat energy from the solar energy to the contaminated fluid and heat from the solar energy causes the water containing salts to distill and separate inside the heat exchanger.

30. An apparatus comprising:
   a. a water desalination apparatus, the water desalination apparatus comprising an inlet wherein water containing salts flows in the water desalination apparatus through the inlet;
   b. at least two outlets on the water desalination apparatus, wherein a first outlet exits purified vapor and a second outlet wherein the water containing salts with a portion removed as purified vapor exits the water desalination apparatus;
   c. solar energy that causes the water containing salts in the water desalination apparatus to heat to a temperature wherein a portion of the water containing salts is converted to purified vapor;
   d. at least two different flow paths, a first flow path connecting at least one inlet to the first outlet and a second flow path connecting the inlet to the second outlet, the first and second flow paths flow through at least a portion of the water desalination apparatus wherein density differences causes the purified vapor to take a different path than the water containing salts with the purified vapor exiting the first outlet and the water containing salts exiting the second outlet.

31. The apparatus of claim 30 further comprising a steam generator connected to the first outlet.

32. The apparatus of claim 30 wherein the water desalination apparatus comprises a heat exchanger in operative connection with the solar energy source, wherein the solar energy source provides the heat energy for distilling and separating salts from the water containing salts inside the heat exchanger.

33. The apparatus of claim 32 further comprising a pump connected to the heat exchanger wherein the pump creates a pressure less than 1 bar inside the heat exchanger.

34. The apparatus of claim 30 further comprising at least one sensor on the water desalination apparatus, at least one valve connected to the water desalination apparatus and on the system, and at least one control panel wherein the control panel uses the at least one sensor and the at least one valve to operate the apparatus.

35. The apparatus of claim 30 further comprising a vapor compression evaporator connected to the heat exchanger.

36. A method for removing salt from water comprising:
   a. providing an apparatus, the apparatus comprising: an inlet wherein the contaminated water flows in the apparatus through the inlet; at least two outlets wherein a first outlet exits purified vapor and a second outlet wherein a component of the contaminated water with a portion removed as purified vapor exits the apparatus; an energy source that causes the contaminated water to heat to a temperature wherein a portion of the contaminated water is converted to purified vapor;

b. flowing contaminated water through the inlet of the apparatus;
c. heating the contaminated water using solar energy to a temperature wherein a portion of the contaminated water is converted to a purified vapor component inside the apparatus;
d. separating the purified vapor component of the contaminated water from the contaminated water component inside the apparatus by providing at least two different flow paths connecting the inlet to the first outlet;
e. exiting the purified vapor component from the first outlet;
f. exiting the contaminated water with a portion removed as the purified vapor component from the second outlet.

37. The method of claim 36 further comprising condensing the purified vapor component into purified water.

38. The method of claim 36 further comprising using a heat exchanger to transfer heat energy from the solar energy to the contaminated fluid and heat from the solar energy causes the water containing salts to distill and separate inside the heat exchanger.

39. The method of claim 38 further comprising using a pump connected to the heat exchanger wherein the pump creates a pressure less than 1 bar inside the heat exchanger.

* * * * *